United States Patent
Mizutaki et al.

(10) Patent No.: US 10,301,493 B2
(45) Date of Patent: May 28, 2019

(54) AQUEOUS INK JET INK COMPOSITION

(71) Applicant: Seiko Epson Corporation, Tokyo (JP)

(72) Inventors: Yusuke Mizutaki, Shiojiri (JP);
Tomohito Nakano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/887,400

(22) Filed: Feb. 2, 2018

(65) Prior Publication Data
US 2018/0265724 A1 Sep. 20, 2018

(30) Foreign Application Priority Data
Mar. 17, 2017 (JP) ................. 2017-052682

(51) Int. Cl.
*C09D 11/36* (2014.01)
*C09D 11/322* (2014.01)
*C09D 11/38* (2014.01)

(52) U.S. Cl.
CPC ............ *C09D 11/36* (2013.01); *C09D 11/322* (2013.01); *C09D 11/38* (2013.01)

(58) Field of Classification Search
CPC .............................. C09D 11/30; C09D 11/322
See application file for complete search history.

(56) References Cited

U.S. PATENT DOCUMENTS

| | | | |
|---|---|---|---|
| 7,955,425 B2 * | 6/2011 | Koganehira | C09D 11/30 106/31.58 |
| 8,435,339 B2 * | 5/2013 | Koyano | B41J 2/14129 106/31.27 |
| 8,992,675 B2 * | 3/2015 | Komatsu | C09D 11/30 106/31.58 |
| 2009/0238974 A1 * | 9/2009 | Kawabe | C09D 11/322 427/256 |
| 2012/0050383 A1 | 3/2012 | Takayama et al. | |
| 2014/0295147 A1 * | 10/2014 | Okuyama | B41J 2/2121 428/195.1 |
| 2014/0335358 A1 | 11/2014 | Hoshino et al. | |
| 2016/0060473 A1 | 3/2016 | Sano et al. | |

FOREIGN PATENT DOCUMENTS

| | | | |
|---|---|---|---|
| JP | 2004026930 A | * | 1/2004 |
| JP | 2012-072359 A | | 4/2012 |
| JP | 2014208778 A | * | 11/2014 |
| JP | 5815744 B2 | | 11/2015 |
| JP | 2016-050220 A | | 4/2016 |

OTHER PUBLICATIONS

English Machine Translation of JP 2004-026930 (Year: 2004).*
English Machine Translation of JP 2014-208778 (Year: 2014).*

* cited by examiner

*Primary Examiner* — Veronica F Faison
(74) *Attorney, Agent, or Firm* — Harness, Dickey & Pierce, P.L.C.

(57) ABSTRACT

An aqueous ink jet ink composition contains a pigment in which the half width of the maximum peak or a peak comparable thereto in an X-ray diffraction spectrum is 0.7° or less and the average value of major axis/minor axis length ratios is 1.7 or less; and an organic solvent A which is one or more selected from the group consisting of alkanediols (1) containing an alkyl skeleton having a branched structure and alkylene glycol alkyl ethers (2) containing at least any one of alkylene glycol containing an alkyl skeleton having a branched structure and an ether of an alkyl group having a branched structure, and which has a normal boiling point of 225° C. or more.

11 Claims, 1 Drawing Sheet

AQUEOUS INK JET INK COMPOSITION

BACKGROUND

1. Technical Field

The present invention relates to an aqueous ink jet ink composition.

2. Related Art

An ink jet recording method enables recording of a high definition image with a relatively simple apparatus and has rapidly developed in various fields. In the development, various examinations have been made for the lightfastness of recorded matter. For example, Japanese Patent No. 5815744 discloses an ink composition containing an insoluble azo pigment excellent in weather (light) fastness and the like. As disclosed in Japanese Patent No. 5815744, the use of a high crystalline pigment as a pigment enables recording of recorded matter excellent in lightfastness. In particular, heretofore, among pigments having high color saturation and excellent color reproducibility, some pigments have been poor in lightfastness. It is known that a high crystalline pigment is useful as a pigment having excellent lightfastness while having excellent color reproducibility.

However, it has been found that, when a high crystalline pigment described in Japanese Patent No. 5815744 is used, poor discharge occurs. When a cause of the poor discharge has been investigated in detail, the presence of air bubbles has been notably observed in a pressure chamber of a head, and thus it has been found that a pressure loss due to the air bubbles is the cause of the poor discharge.

Moreover, Japanese Patent No. 5815744 discloses an ink composition containing triethylene glycol monobutyl ether having a relatively high boiling point as a solvent. However, it has been found that, when such a solvent is used, the generation of poor discharge is remarkable when using a high crystalline pigment. On the other hand, some of organic solvents having a relatively low boiling point have been excellent in discharge stability even when a high crystalline pigment has been used. However, there is a background that an ink composition having a small volatile organic compound (VOC) dissipation amount has been desired in order to achieve an environmental regulation standard for environmental compatibility, and thus, it has been desired to achieve excellent discharge stability and a small VOC dissipation amount even when a high crystalline pigment is used.

SUMMARY

The invention has been made in order to at least partially solve the above-described problems. An advantage of some aspects of the invention is to provide an ink composition having excellent lightfastness, high discharge stability, and a small VOC dissipation amount.

The present inventors have conducted an extensive examination in order to solve the above-described problems. As a result, the present inventors have found an organic solvent which has a relatively high boiling point but which is excellent in discharge stability even when a high crystalline pigment is used and have found that the above-described problems can be solved by the use of the organic solvent, and thus have completed the invention.

More specifically, according to an aspect of the invention, an aqueous ink jet ink composition contains a pigment in which the half width of the maximum peak or a peak comparable thereto in an X-ray diffraction spectrum is 0.7° or less and the average value of major axis/minor axis length ratios is 1.7 or less; and an organic solvent A which is one or more selected from the group consisting of alkanediols (1) containing an alkyl skeleton having a branched structure and alkylene glycol alkyl ethers (2) containing at least any one of alkylene glycol containing an alkyl skeleton having a branched structure and an ether of an alkyl group having a branched structure, and which has a normal boiling point of 225° C. or more. In the aspect of the invention, it is preferable that the pigment is an azo-based pigment, the organic solvent A contains an organic solvent having a normal boiling point of 245° C. or more, the content of an organic solvent having a normal boiling point of less than 225° C. is 1% by mass or less based on the total amount of the ink composition, the content of the organic solvent A is 0.5 to 20% by mass based on the total amount of the ink composition, the content of the pigment is 0.5 to 15% by mass based on the total amount of the ink composition, the organic solvent A contains an organic solvent having 5 to 15 carbon atoms, an organic solvent which has a normal boiling point of more than 280° C. and which is other than the organic solvent A is further contained, the surface tension is 34 mN/m or less, a surfactant is further contained, the surfactant contains at least one selected from the group consisting of a silicone-based surfactant, an acetylene glycol-based surfactant, and a fluorine-based surfactant, and the organic solvent A contains alkanediols (1) containing an alkyl skeleton having a branched structure and alkylene glycol alkyl ethers (2) containing at least any one of alkylene glycol containing an alkyl skeleton having a branched structure and an ether of an alkyl group having a branched structure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
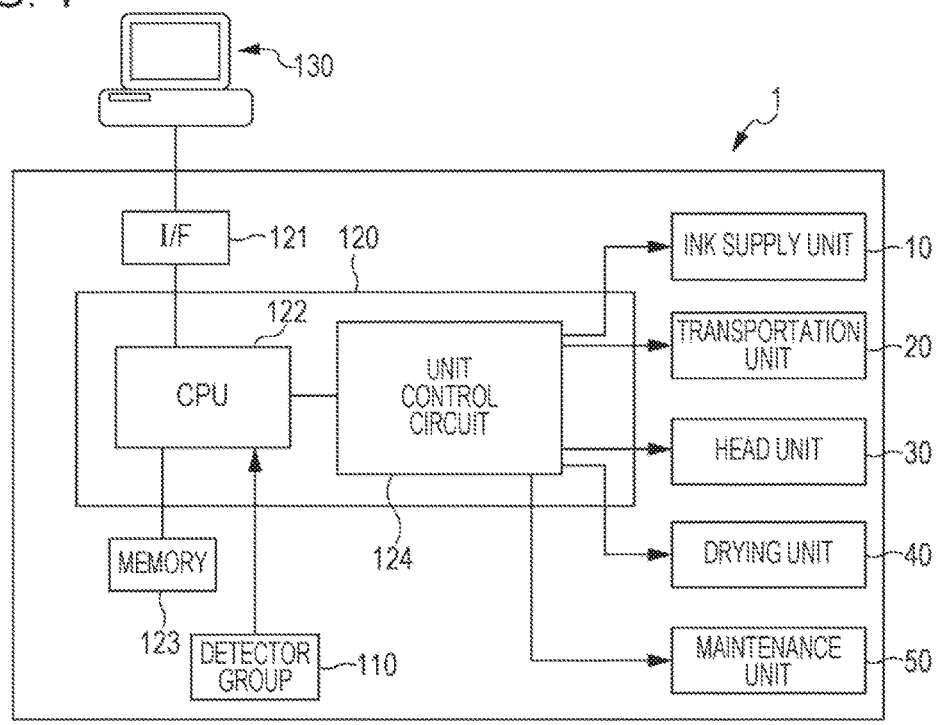
FIG. 1 is a block diagram illustrating an example of the configuration of a recording apparatus which may be used in this embodiment.

Hereinafter, an embodiment of the invention (hereinafter, referred to as "this embodiment") is described in detail with reference to the drawings as necessary, but the invention is not limited thereto and can be variously modified without deviating from the scope of the invention. In the drawings, the same components are designated by the same reference numerals and the duplicated description is omitted. The positional relationship, such as left, right, top and bottom, shall be based on the positional relationship illustrated in the drawings unless otherwise particularly specified. Furthermore, the dimension ratio of the drawings is not limited to the ratio in the drawings.

Aqueous Ink Jet Ink Composition

An aqueous ink jet ink composition according to this embodiment contains a pigment in which the half width of the maximum peak or a peak comparable thereto in an X-ray diffraction spectrum is 0.7° or less and the average value of major axis/minor axis length ratios is 1.7 or less; and an organic solvent A which is one or more selected from the group consisting of alkanediols (1) containing an alkyl skeleton having a branched structure and alkylene glycol alkyl ethers (2) containing at least any one of alkylene glycol containing an alkyl skeleton having a branched structure and an ether of an alkyl group having a branched structure, and which has a normal boiling point of 225° C. or more.

Pigment

In the pigment to be used in this embodiment, the half width of the maximum peak or a peak comparable thereto in an X-ray diffraction spectrum is 0.7° or less and the average value of the major axis/minor axis length ratios is 1.7 or less.

The half width of the maximum peak or a peak comparable thereto in an X-ray diffraction spectrum is 0.7° or less, preferably 0.5° or less, and more preferably 0.42° or less. The lowest limit of the half width of the maximum peak or a peak comparable thereto in an X-ray diffraction spectrum is preferably 0.1° or more, more preferably 0.2° or more, and still more preferably 0.3° or more. When the half width is within the ranges mentioned above, a sharp diffraction spectrum is exhibited, which means that the crystallinity of the pigment is high. Thus, there is a tendency that the lightfastness of the pigment is further improved. The half width of the maximum peak or a peak comparable thereto in an X-ray diffraction spectrum means the peak width (angle) at ½ of the X-ray intensity from the baseline of the maximum peak or a peak comparable thereto in an X-ray diffraction spectrum to Cu-Kα rays. The half width of the maximum peak or a peak comparable thereto in an X-ray diffraction spectrum can be adjusted by controlling the crystallinity in a pigment preparation method described later. The "maximum peak or a peak comparable thereto" refers to peaks from the maximum peak to approximately the third peak and the "maximum peak" refers to a peak in which the tendency that the half width is smaller (narrower) when the crystallinity is higher is the strongest. Specifically, the "maximum peak or a peak comparable thereto" can be determined by preparing pigments from a high crystalline pigment to a low crystalline pigment, calculating the half width for each peak, and then determining a peak having a tendency that the half width is smaller in a higher crystalline pigment. For example, in the case of C.I. Pigment Yellow 74, a peak around 11.8° is the "maximum peak or a peak comparable thereto". A specific method for measuring the half width is based on the description of Examples.

Such a high crystalline pigment tends to have a shape of a needle or the like. Such a pigment has a tendency that a particle (primary particle) thereof has a shape in which the average value of the major axis/minor axis length ratios is larger than 1. The primary particle is a particle containing a single particle and secondary particles are particles formed of two or more of the primary particles.

The average value of the major axis/minor axis length ratios of the pigment is 1.7 or less, preferably 1.5 or less, and more preferably 1.4 or less. The lower limit of the average value of the major axis/minor axis length ratios of the pigment is 1 or more and preferably 1.1 or more. The pigment tends to have a needle shape, an oval-spherical shape, or a lump shape. When the average value of the major axis/minor axis length ratios of the pigment is within the ranges mentioned above, the particle diameter stability of the pigment and the storage stability of an ink are improved in the ink composition containing the pigment. Moreover, the pigment is also preferable because the pigment is easily available. The average value of the major axis/minor axis length ratios of the pigment can be adjusted by a grinding treatment described later.

The major axis/minor axis length ratio of the pigment can be determined by, for example, photographing pigment particles using a scanning electron microscope, measuring the minor axis and the major axis of a primary particle of the pigment, and then calculating a ratio of the major axis to the minor axis (Major axis/Minor axis). Then, the major axis/minor axis length ratio is calculated for the primary particles of about 100 arbitrarily selected pigments by the same operation, and then the average value thereof is set as the average value of the major axis/minor axis length ratios of the pigments. The major axis/minor axis length ratio of the pigment may be measured by a method capable of measuring the ratio of the minor axis to the major axis of the primary particle of a pigment without being limited to the above-described method. It is also possible to measure the major axis/minor axis length ratio of a primary particle of a pigment in a state of being contained in an ink composition or a pigment dispersion liquid using a transmission electron microscope.

Examples of the type of the pigment to be used in this embodiment include, but are not particularly limited to, an azo-based pigment, a quinacridone-based pigment, a quinacridonequinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and the like, for example. Among the above, the azo-based pigment is preferable from the viewpoint of more effectively demonstrating the effects of the invention. The following substances are mentioned as specific example of these pigments.

Examples of pigments for use in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 150, 151, 153, 154, 155, 167, 172, 180, 185, and 213, and the like. Among the above, the C.I. Pigment Yellow 74 is preferable from the viewpoint of more effectively demonstrating the effects of the invention.

Examples of pigments for use in a cyan ink include C.I. Pigment Blue 1, 2, 3, 15, 15:1, 15:2, 15:3, 15:4, 15:6, 15:34, 16, 18, 22, 60, 65, and 66, C.I. Vat Blue 4 and 60, and the like.

Examples of pigments for use in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, C.I. Pigment Violet 19, 23, 32, 33, 36, 38, 43, and 50, and the like.

Examples of pigments for use in an orange ink include C.I. pigment Orange 1, 13, 16, 34, 36, 60, 61, 62, 64, 67, and 72, and the like.

Examples of pigments for use in an ink of a color other than the colors mentioned above, such as a green ink, include known substances.

As azo-based pigments among pigments, although not limited to, examples of pigments for use in a yellow ink include C.I. Pigment Yellow 1, 3, 4, 6, 12, 14, 17, 24, 55, 65, 73, 74, 81, 83, 95, 97, 117, 120, 128, 129, 150, 151, 153, 154, 155, 167, 180, 185, and 213, examples of pigments for use in a magenta ink include C.I. Pigment Red 1, 2, 3, 4, 5, 9, 12, 23, 48 (Mn), 57 (Ca), 57:1, 112, 114, 144, 146, 166, 175, 176, 184, and 185, and examples of pigments for use in an orange ink include C.I. pigment orange 1, 13, 16, 34, 36, 60, 61, 62, 64, 67, and 72, and the like.

Particularly when formed into a high crystalline pigment, the azo-based pigment tends to have a needle shape or the like and tends to have a shape in which the average value of the major axis/minor axis length ratios of the particles (primary particles) is larger than 1, and is preferable because this embodiment is particularly useful.

The content of the pigment is preferably 0.5% by mass or more, more preferably 1% by mass or more, and still more preferably 2% by mass or more based on the total amount of the ink composition. When the content of the pigment is 0.5% by mass or more, the color reproducibility tends to be further improved. The content of the pigment is preferably 15% by mass or less, more preferably 10% by mass or less, and still more preferably 7% by mass or less based on the total amount of the ink composition. When the content of the pigment is 15% by mass or less, the discharge stability tends to be further improved.

A method for preparing an azo-based pigment in the case of using the azo-based pigment as the pigment to be used in this embodiment is described as an example, but a method for preparing the pigment is not particularly limited to the following method. The azo-based pigment can grow (age) pigment particles by heating a pigment slurry obtained by a diazotization/coupling reaction. In the heating, a water-soluble organic solvent, for example, ethylene glycol, N-methyl pyrrolidone, or the like may be mixed or a hydrophobic organic solvent, for example, xylene, dichlorobenzene, or the like may be formed into an emulsion with a surfactant, and then the emulsion may be added, followed by heating. After the aging, the obtained pigment particles are washed with water, filtered, and then dried.

The azo pigment thus obtained generally has an average particle diameter of about 5 to 10 µm and is referred to as a so-called secondary particle obtained by aggregation of the primary particles. The pigment having relatively coarse particles can be pulverized to be used for an ink. Examples of one aspect of the pulverization method include a so-called solvent salt milling method including charging a water-soluble inorganic salt, such as sodium chloride or sodium sulfate, a dispersant, and a water-soluble organic solvent, such as ethylene glycol, diethylene glycol, or polyethylene glycol, in an appropriate ratio in a kneader, kneading the contents for a given period of time while controlling the temperature, placing the resultant substance in a warmed dilute sulfuric acid aqueous solution and stirring the resultant solution, performing filtration and washing with water to remove the water-soluble inorganic salt and the water-soluble organic solvent, drying the resultant substance with warm air, and then grinding the resultant substance to obtain a dry pigment. Among the azo pigments, crystal growth easily occurs with the above-described solvent in some azo pigments and thus salt milling not using the above-described solvent is performed in some cases. Moreover, dry milling methods using a ball mill and a vibration mill are also mentioned, in which a grinding medium, such as a steel ball or a steel rod, is used, and, as necessary, an inorganic salt is used as a grinding assistant. When the grinding treatment is performed, a high shearing force acts on the contents under pressurization, and therefore high frictional heat is generated, so that crystal growth occurs in the pigment in some cases. Therefore, in this embodiment, it is preferable to suppress the crystal growth by adding 0.1 to 10% by weight and preferably 0.5 to 5% by weight of a sulfonic acid derivative of the azo pigment or a pigment derivative in which an aliphatic N-substituted alkyl amine residue is introduced into the anthraquinone-based pigment to a base pigment.

Pigment Dispersion

The pigment of this embodiment may be contained in the ink composition as a pigment dispersion in the form of being dispersed in a dispersion medium, such as water. The pigment dispersion is obtained by dispersing the particles obtained by preparing the pigment described above in a dispersion medium by a dispersion process.

The pigment dispersion is obtained by a method including dispersing the pigment with a resin dispersant, such as a water-soluble resin, a water-dispersible resin, or a resin having an intermediate property between the water-soluble resin and the water-dispersible resin, as a pigment dispersant so that the pigment can be stably dispersed and held in a dispersion medium, such as water (Hereinafter, a pigment treated by this method is described as "resin dispersion pigment".), a method including dispersing the pigment with a surfactant, such as a water-soluble surfactant, a water-dispersible surfactant, or a surfactant having an intermediate property between the water-soluble surfactant and water-dispersible surfactant (Hereinafter, a pigment treated by this method is described as "surfactant dispersion pigment".), a method including chemically and physically introducing a hydrophilic functional group into the surface of pigment particles to make the pigment dispersible and/or soluble in water without dispersants, such as the above-described resin or the above-described surfactant (Hereinafter, a pigment treated by this method is described as a "surface treated pigment".), and the like. For the ink composition according to this embodiment, any of the resin dispersion pigment, the surfactant dispersion pigment, and the surface treated pigment described above can be used and can also be used as a mixture of two or more thereof as necessary.

Examples of the resin dispersant for use in the resin dispersion pigment include polyvinyl alcohols, polyacrylic acids, acrylic acid-acrylonitrile copolymers, vinyl acetate-acrylic ester copolymers, acrylic acid-acrylic ester copolymers, styrene-acrylic acid copolymers, styrene-methacrylic acid copolymers, styrene-methacrylic acid-acrylic ester copolymers, styrene-α-methylstyrene-acrylic acid copolymers, styrene-α-methylstyrene-acrylic acid-acrylic ester copolymers, styrene-maleic acid copolymers, styrene-maleic anhydride copolymers, vinyl naphthalene-acrylic acid copolymers, vinyl naphthalene-maleic acid copolymers, vinyl acetate-maleic ester copolymers, vinyl acetate-crotonic acid copolymers, vinyl acetate-acrylic acid copolymers, and the like and salts thereof. Among the above, copolymers of monomers having hydrophobic functional groups and monomers having hydrophilic functional groups and polymers containing monomers having hydrophobic functional groups and hydrophilic functional groups are preferable. As the form of the copolymers, any form of a random copolymer, a block copolymer, an alternating copolymer, and a graft copolymer is usable.

Examples of the salts include salts with basic compounds, such as ammonia, ethylamine, diethylamine, triethylamine, propylamine, isopropylamine, dipropylamine, butylamine, isobutylamine, diethanolamine, triethanolamine, triisopropanolamine, aminomethyl propanol, and morpholine. The addition amount of these basic compounds is not particularly limited insofar as the addition amount is equal to or more than the neutralization equivalent of the resin dispersant.

The molecular weight of the resin dispersant is preferably within the range of 1,000 to 100,000, and more preferably within the range of 3,000 to 10,000 as the weight average molecular weight. When the molecular weight is within the ranges mentioned above, the pigment is stably dispersed in water and the viscosity control or the like when applied to the ink composition is easily performed.

The acid value is preferably within the range of 20 to 300, and more preferably within the range of 40 to 150. When the acid value is within the ranges mentioned above, the dispersibility of the pigment particles in water is stable and the water resistance and the color development properties of recorded matter recorded with ink, the composition of which contains the same, are improved.

As the resin dispersant described above, commercially-available items are also usable. In detail, Joncryl 67 (Weight average molecular weight: 12,500, Acid value: 213), Joncryl 678 (Weight average molecular weight: 8,500, Acid value: 215), Joncryl 586 (Weight average molecular weight: 4,600, Acid value: 108), Joncryl 611 (Weight average molecular weight: 8,100, Acid value: 53), Joncryl 680 (Weight average molecular weight: 4,900, Acid value: 215), Joncryl 682 (Weight average molecular weight: 1,700, Acid value: 238), Joncryl 683 (Weight average molecular weight: 8,000, Acid value: 160), Joncryl 690 (Weight average molecular weight: 16,500, Acid value: 240) (all Trade Names, manufactured by Basf Japan, Inc.), and the like are mentioned.

Examples of the surfactant for use in the surfactant dispersion pigment include anionic surfactants, such as alkanesulfonate, α-olefin sulfonate, alkyl benzenesulfonate, alkyl naphthalene sulfonate, acyl methyl taurate, dialkyl sulfosuccinate, an alkyl sulfate ester salt, sulfonated olefin, a polyoxyethylene alkylether sulfate ester salt, an alkyl phosphate ester salt, a polyoxyethylene alkyl ether phosphate ester salt, and a monoglycerite phosphate ester salt, amphoteric surfactants, such as an alkyl pyridium salt, an alkylamino acid salt, and alkyl dimethyl betaine, and nonionic surfactants, such as polyoxyethylene alkyl ether, polyoxy ethylene alkyl phenyl ether, polyoxy ethylene alkylester, polyoxy ethylene alkyl amide, glycerol alkylester, and sorbitan alkylester.

The addition amount of the resin dispersant or the surfactant to the pigment is preferably 1 part by mass to 100 parts by mass, and more preferably 5 parts by mass to 50 parts by mass based on 100 parts by mass of the pigment. When the addition amount is within the ranges mentioned above, the dispersion stability of the pigment in water can be secured.

Examples of the surface treated pigment include —OM, —COOM, —CO—, —SO$_3$M, —SO$_2$NH$_2$, —RSO$_2$M, —PO$_3$HM, —PO$_3$M$_2$, —SO$_2$NHCOR, —NH$_3$, —NR$_3$ (wherein, M in each of the formulae represents a hydrogen atom, an alkali metal, ammonium, or organic ammonium, and R represents an alkyl group having 1 to 12 carbon atoms, a phenyl group which may have a substituent, or a naphthyl group which may have a substituent), and the like as a hydrophilic functional group. These functional groups are physically and/or chemically introduced into the surface of the pigment particles by being grafted directly and/or through a polyvalent group. Examples of the polyvalent group include an alkylene group having 1 to 12 carbon atoms, a phenylene group which may have a substituent, a naphthylene group which may have a substituent, or the like.

The surface treated pigment described above is preferably one which is surface treated so that —SO$_3$M and/or —RSO$_2$M (M is a counter ion and represents a hydrogen ion, an alkali metal ion, an ammonium ion, or an organic ammonium ion) are/is chemically bonded to the surface of the pigment particles by a treatment agent containing sulfur, i.e., a pigment which is made dispersible and/or soluble in water by being dispersed in a solvent which does not have an active proton, which does not have reactivity with sulfonic acid, and in which the pigment is insoluble or hardly soluble, and then being surface treated so that —SO$_3$M and/or —RSO$_2$M are/is chemically bonded to the surface of the particles by amidosulfuric acid or a complex of sulfur trioxide and tertiary amine.

One or two or more functional groups may be grafted to one pigment particle. The type of the functional group to be grafted and the degree thereof may be determined as appropriate considering the dispersion stability in an ink, the color density, the drying characteristics on the front surface of an ink jet recording head, and the like.

A method for dispersing the resin dispersion pigment, the surfactant dispersion pigment, and the surface treated pigment described above in a dispersion medium, such as water, can be performed by adding the pigment, water, and a resin dispersant with respect to the resin dispersion pigment, the pigment, water, and a surfactant with respect to the surfactant dispersion pigment, and the surface treated pigment and water with respect to the surface treated pigment and, as necessary, a water-soluble organic solvent/neutralizer and the like to each pigment, and then performing dispersion with a disperser used heretofore, such as a ball mill, a sand mill, an attritor, a roll mill, an agitator mill, a Henschel mixer, a colloid mill, an ultrasonic homogenizer, a jet mill, and an angmill. An ink composition may be prepared using the pigment dispersion liquid containing the pigment dispersion thus obtained.

Organic Solvent A

The organic solvent A is at least one selected from the group consisting of alkanediols (1) containing an alkyl skeleton having a branched structure and alkylene glycol alkyl ethers (2) containing at least any one of alkylene glycol containing an alkyl skeleton having a branched structure and an ether of an alkyl group having a branched structure and has a normal boiling point of 225° C. or more.

It is presumed that there is a tendency in the above-described high crystalline pigment to be used in this embodiment that air is likely to remain in a gap present in the pigment, and the remaining air serves as a bubble nucleus to promote the generation of air bubbles in an ink. However, it is presumed that, when the ink composition contains the organic solvent A, the organic solvent A permeates into the pigment to remove the air remaining in the pigment, and therefore excellent discharge stability is achieved.

Moreover, it is preferable for the ink composition to contain the organic solvent A because the surface tension of an ink is reduced, and the discharge from an ink jet head is facilitated.

Alkanediols (1) Containing Alkyl Skeleton Having Branched Structure

Examples of the alkanediols (1) containing an alkyl skeleton having a branched structure include, but are not particularly limited to, 2-methyl-1,3-butanediol, 2-methyl-1,5-pentanediol, 2-methyl-2,4-pentanediol, 2-methyl-1,6-hexanediol, 2-ethyl-1,3-butanediol, 2-ethyl-1,5-pentanediol, 2-ethyl-2,4-pentanediol, 2-ethyl-1,3-hexanediol, 3-methyl-1,3-butanediol, 3-methyl-1,5-pentanediol, 2-methyl-2,4-pentanediol, 3-methyl-1, 6-hexanediol, 3-ethyl-1, 3-butanediol, 3-ethyl-1,5-pentanediol, 3-ethyl-2,4-pentanediol, and 3-ethyl-1,3-hexanediol, for example. Among the above, the 3-methyl-1,5-pentanediol and the 2-ethyl-1,3-hexanediol are preferable.

The number of carbon atoms of the alkyl skeleton in the alkanediols (1) is preferably 5 or more, and more preferably 6 or more. The number of carbon atoms of the alkyl skeleton in the alkanediols (1) is preferably 10 or less, and more preferably 8 or less.

Alkylene Glycol Alkyl Ethers (2)

Examples of the above-described alkylene glycol alkyl ethers (2) include, but are not particularly limited to, alkylene glycol monoalkyl ethers, such as ethylene glycol-2-ethyl hexyl ether, diethylene glycol-2-ethyl hexyl ether, triethylene glycol-2-ethyl hexyl ether, propylene glycol-2-ethyl hexyl ether, dipropylene glycol-2-ethyl hexyl ether, tripropylene glycol-2-ethyl hexyl ether, butylene glycol-2-ethyl hexyl ether, dibutylene glycol-2-ethyl hexyl ether, and tributylene glycol-2-ethyl hexyl ether; and alkylene glycol dialkyl ethers, such as ethylene glycol-diethyl hexyl ether, diethylene glycol-diethyl hexyl ether, triethylene glycol-diethyl hexyl ether, propylene glycol-diethyl hexyl ether, dipropylene glycol-diethyl hexyl ether, tripropylene glycol-diethyl hexyl ether, butylene glycol-diethyl hexyl ether, dibutyleneglycol-diethyl hexyl ether, and tributylene glycol-diethyl hexyl ether, for example. Among the above, the alkylene glycol monoalkyl ether is preferable, and the ethylene glycol-2-ethyl hexyl ether and the diethylene glycol-2-ethyl hexyl ether are more preferable.

The number of carbon atoms of the alkyl skeleton in the alkylene glycol alkyl ethers (2) is preferably 2 or more, and more preferably 3 or more. The number of carbon atoms of the alkyl skeleton in the alkylene glycol alkyl ethers (2) is preferably 5 or less, and more preferably 4 or less.

The number of carbon atoms of the alkyl group in the alkylene glycol alkyl ethers (2) is preferably 2 or more, and more preferably 3 or more. The number of carbon atoms of the alkyl group in the alkylene glycol alkyl ethers (2) is preferably 5 or less, and more preferably 4 or less.

As the organic solvent A, an organic solvent having 5 to 15 carbon atoms is preferably contained. The number of carbon atoms of such an organic solvent is preferably 6 or more. The number of carbon atoms of the organic solvent is preferably 10 or less, and more preferably 8 or less.

The organic solvent A is an organic solvent having a normal boiling point of 225° C. or more. The normal boiling point of such an organic solvent is preferably 230° C. or more, more preferably 240° C. or more, still more preferably 245° C. or more, and particularly preferably 250° C. or more. By the use of the organic solvent A having a normal boiling point of 225° C. or more, the volatile organic compound (VOC) dissipation amount tends to further decrease. The normal boiling point of such an organic solvent is preferably 280° C. or less and more preferably 270° C. or less. By the use of the organic solvent A having a normal boiling point of 280° C. or less, the discharge stability tends to be further improved.

The content of the organic solvent A is preferably 0.5% by mass or more, more preferably 1% by mass or more, still more preferably 5% by mass or more, and yet still more preferably 7% by mass or more based on the total amount of the ink composition. When the content of the organic solvent A is 0.5% by mass or more, the discharge stability tends to be further improved. The content of the organic solvent A is preferably 20% by mass or less, more preferably 15% by mass or less, and still more preferably 12% by mass or less based on the total amount of the ink composition. When the content of the organic solvent A is 20% by mass or less, the volatile organic compound (VOC) dissipation amount tends to further decrease.

Among the organic solvents A, the alkanediols (1) containing an alkyl skeleton having a branched structure are preferable because the alkanediols (1) containing an alkyl skeleton having a branched structure have high solubility in water, can be compounded in a relatively large proportion in an ink, and easily reduce the surface tension of an ink as compared with the above-described alkylene glycol alkyl ethers (2). The above-described alkylene glycol alkyl ethers (2) are preferable because the discharge stability is particularly excellent.

It is preferable for the ink composition to contain both the alkanediols (1) containing an alkyl skeleton having a branched structure and the above-described alkylene glycol alkyl ethers (2) because the discharge stability can be sufficiently enhanced and also the moisture retention, the permeability into a recording medium, the storage stability, and the like of an ink can be enhanced.

When the ink composition contains the alkanediols (1) containing an alkyl skeleton having a branched structure, the content thereof is preferably 0.5 to 20% by mass, more preferably 1 to 15% by mass, and still more preferably 3 to 13% by mass based on an ink.

When the ink composition contains the above-described alkylene glycol alkyl ethers (2), the content thereof is preferably 0.1 to 10% by mass, more preferably 0.2 to 5% by mass, and still more preferably 0.3 to 1% by mass based on an ink.

The aqueous ink jet ink composition of this embodiment may contain an organic solvent having a low normal boiling point (hereinafter, also referred to as "organic solvent B" for convenience), but preferably contains no organic solvent having a low normal boiling point. The normal boiling point of such an organic solvent B is preferably less than 225° C., more preferably less than 230° C., and still more preferably less than 250° C. The content of the organic solvent B is preferably 1% by mass or less, more preferably 0.5% by mass or less, and still more preferably 0.1% by mass or less based on the total amount of the ink composition, and preferably contains substantially no organic solvent B. When the content of the organic solvent B is within the ranges mentioned above, the volatile organic compound (VOC) dissipation amount tends to further decrease.

Examples of the organic solvent B include those which are the alkanediols (1) containing an alkyl skeleton having a branched structure or the alkylene glycol alkyl ethers (2) containing at least any one of alkylene glycol containing an alkyl skeleton having a branched structure and an ether of an alkyl group having a branched structure described above and which have a normal boiling point of less than 225° C., or those which are other than the alkanediols (1) containing an alkyl skeleton having a branched structure or the alkylene glycol alkyl ethers (2) containing at least any one of alkylene glycol containing an alkyl skeleton having a branched structure and an ether of an alkyl group having a branched structure described above and which have a normal boiling point of less than 225° C.

The aqueous ink jet ink composition of this embodiment may contain an organic solvent having a normal boiling point of more than 280° C. and being an organic solvent (hereinafter, also referred to as "organic solvent C" for convenience) other than the organic solvent A. The content of the organic solvent C is preferably 1% by mass or more, and more preferably 5% by mass or more based on the total amount of the ink composition. The content of such an organic solvent C is preferably 25% by mass or less, more preferably 20% by mass or less, and still more preferably 15% by mass or less based on the total amount of the ink composition. When the content of the organic solvent C is within the ranges mentioned above, the discharge stability tends to be further improved.

Examples of the organic solvent C include polyol compounds of triol or higher, such as glycerol, diol compounds, such as alkylene glycols and alkanediols, glycol ether compounds, such as glycol monoethers and glycol diethers, and the like (those other than the organic solvent A).

The surface tension of the aqueous ink jet ink composition of this embodiment is preferably 34 mN/m or less, more preferably 32 mN/m or less, and still more preferably 30 mN/m or less. The surface tension of the aqueous ink jet ink composition is preferably 20 mN/m or more. When the surface tension of the aqueous ink jet ink composition of this embodiment is within the ranges mentioned above, the discharge stability tends to be further improved. As a method for measuring the surface tension, a method for measuring the surface tension at a liquid temperature of 25° C. by the Wilhelmy method using a surface tension meter (for example, Surface tension meter CBVP-Z manufactured by Kyowa Interface Science Co., LTD., and the like) can be generally mentioned as an example.

Water

The aqueous ink jet ink composition to be used in this embodiment further contains water. Examples of water include those in which ionic impurities are removed as much as possible, such as pure water and ultrapure water, such as ion exchanged water, ultrafiltration water, reverse osmosis water, and distilled water, for example.

The content of water is preferably 55 to 85% by mass, more preferably 60 to 80% by mass, and still more preferably 65 to 75% by mass based on the total amount of the ink composition.

Surfactant

The aqueous ink jet ink composition to be used in this embodiment preferably contains a surfactant. Examples of the surfactant include, but are not particularly limited to, at least one selected from the group consisting of a silicone-based surfactant, an acetylene glycol-based surfactant, and a fluorine-based surfactant, for example.

Examples of the silicone-based surfactant include a polysiloxane-based compound, polyether-modified organosiloxane, and the like. Specific examples of commercially-available items of the silicone-based surfactant include, but are not particularly limited to, BYK-306, BYK-307, BYK-333, BYK-341, BYK-345, BYK-346, BYK-347, BYK-348, and BYK-349 (all Trade Names, manufactured by BYK Chemie Japan, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all Trade Names, manufactured by Shin-Etsu Chemical Co., Ltd.), and the like.

The acetylene glycol-based surfactant is not particularly limited and is preferably one or more selected from 2,4,7,9-tetramethyl-5-decyne-4,7-diol and an alkylene oxide adduct of 2,4,7,9-tetramethyl-5-decyne-4,7-diol and 2,4-dimethyl-5-decyne-4-ol and an alkylene oxide adduct 2,4-dimethyl-5-decyne-4-ol, for example. Examples of commercially-available items of the acetylene glycol-based surfactant include, but are not particularly limited to, Olefin 104 series and E series, such as Olefin E1010 (Trade Name, manufactured by Air Products Japan, Inc.), Surfynol 465 and Surfynol 61 (Trade Name, manufactured by Nissin Chemical Industry CO., Ltd.), and the like, for example. The acetylene glycol-based surfactants may be used alone or in combination of two or more thereof.

Examples of the fluorine-based surfactant include, but are not particularly limited to, a perfluoroalkyl sulfonate salt, a perfluoroalkyl carboxylate salt, perfluoroalkyl phosphate ester, a perfluoroalkyl ethylene oxide adduct, perfluoroalkyl betaine, and a perfluoroalkyl amine oxide compound, for example. Examples of commercially-available items of the fluorine-based surfactant include, but are not particularly limited to, S-144 and S-145 (manufactured by Asahi Glass Co., Ltd.); FC-170C, FC-430, and Fluorad FC4430 (manufactured by Sumitomo 3M, Inc.); FSO, FSO-100, FSN, FSN-100, and FS-300 (manufactured by Dupont); FT-250 and 251 (manufactured by Neos Co., Ltd.), and the like, for example. The fluorine-based surfactants may be used alone or in combination of two or more thereof.

The content of the surfactant is preferably 0.1 to 5% by mass and more preferably 0.1 to 3% by mass based on the total mass of the ink composition. When the content of the surfactant is within the ranges mentioned above, the discharge stability tends to be further improved.

PH Adjuster

The aqueous ink jet ink composition to be used in this embodiment preferably contains a pH adjuster. The pH adjuster can facilitate the adjustment of the pH value of an ink. Examples of the pH adjuster include, but are not particularly limited to, inorganic acids (for example, sulfuric acid, hydrochloric acid, nitric acid, and the like), inorganic bases (for example, lithium hydroxide, sodium hydroxide, potassium hydroxide, ammonia, and the like), organic bases (triethylamine, triethanolamine, diethanolamine, monoethanolamine, and tripropanolamine), organic acids (for example, adipic acid, citric acid, succinic acid, and the like), and the like, for example. The pH adjusters may be used alone or as a mixture of two or more thereof. The normal boiling point of the pH adjuster is preferably 50° C. or more, more preferably 100° C. or more, and still more preferably 200° C. or more. The upper limit is not limited and is preferably 400° C. or less. It is preferable that the normal boiling point of the pH adjuster is within the ranges mentioned above because the VOC dissipation amount further decreases.

Recording Method

An ink jet recording method using the aqueous ink jet ink composition of this embodiment may have a process of discharging the aqueous ink jet ink composition from a nozzle of a head to cause the aqueous ink jet ink composition to adhere to a target recording medium and may have a drying process and the like as appropriate.

Target Recording Medium

The ink composition according to this embodiment can be widely used to an absorptive target recording medium, a low absorptive target recording medium, and a non-absorptive target recording medium.

Examples of the absorptive target recording medium include, but are not particularly limited to, plain paper, such as an electrophotographic paper, and ink jet printing paper (paper for exclusive use for ink jet having an ink absorbing layer containing silica particles or alumina particles or an ink absorbing layer containing a hydrophilic polymer typified by polyvinyl alcohol (PVA) or polyvinyl pyrrolidone (PVP)) having high permeability of the ink composition and an art paper, a coated paper, a cast paper, and the like for use in general offset printing having relatively low permeability of the ink composition, for example.

Examples of the low absorptive recording medium include, but are not particularly limited to, a coated paper having a coated layer for receiving an oil-based ink on the surface, for example. Examples of the coated paper include, but are not particularly limited to, printing paper typified by an art paper, a coated paper, and a mat paper, for example.

Examples of the non-absorptive target recording medium include, but are not particularly limited to, those in which plastic is coated on a base material typified by a plastic film and paper not having an ink absorbing layer, those in which a plastic film is bonded to the base material, and the like, for example. Examples of the plastic as used herein include polyvinyl chloride, polyethylene terephthalate, polycarbonate, polystyrene, polyurethane, polyethylene, polypropylene, and the like.

Herein, the "low absorptive target recording medium" and the "non-absorptive target recording medium" refer to target recording media in which the water absorption amount from the initiation of contact to 30 msec is 10 mL/m$^2$ or smaller in the Bristow method". This Bristow method is the most spread method as a method for measuring the liquid absorption amount in a short time and is used also in the Japan Technical Association of the Pulp and Paper Industry (JAPAN TAPPI). The details of a test method are described in "Liquid Absorbency Test Method of Paper and Paperboard (Bristow Method)" of Standard No. 51 of "JAPAN TAPPI paper pulp test method, 2000".

Ink Jet Recording Apparatus

FIG. 1 illustrates a block diagram illustrating an example of the configuration of a recording apparatus which may be used in this embodiment. In a computer 130, a printer driver is installed. The computer 130 outputs print data according to an image to the printer 1 in order to cause a printer 1 to record the image. The printer 1 is equivalent to the "recording apparatus". The printer 1 has an ink supply unit 10, a transportation unit 20, a head unit 30, a drying unit 40, a maintenance unit 50, a detector group 110, a memory 123, an interface 121, and a controller 120. The controller 120 has a CPU 122 and a unit control circuit 124. The printer 1 receiving the print data from the computer 130 which is an external apparatus controls each unit by the controller 120 to control various recording conditions, and records an image on a target recording medium according to the print data. The status inside the printer 1 is monitored by the detector group 110, and the detector group 110 outputs detection results to the controller 120. The controller 120 controls each unit based on the detection results output from the detector group 110, and stores the print data input through the interface 121 in the memory 123. The memory 123 also stores control information for controlling each unit. The drying unit 40 has a heater, an air blower, or the like, and dries a composition, such as an ink, adhering to a target recording medium.

Figure 2:
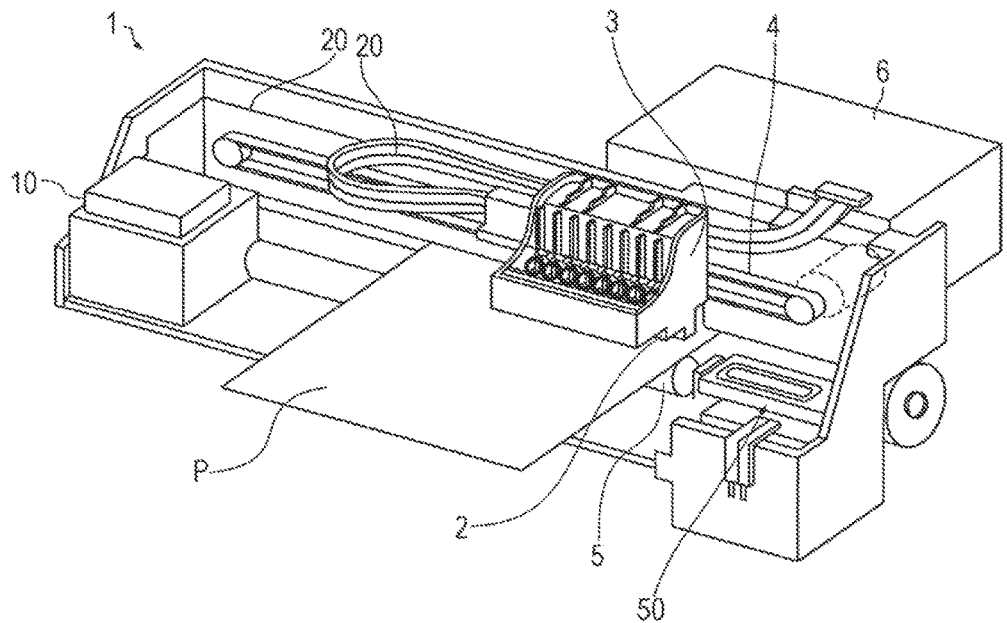
FIG. 2 is a perspective view illustrating a recording apparatus in this embodiment.

FIG. 2 is a perspective diagram illustrating the configuration of a recording apparatus (printer 1) in this embodiment. The printer 1 illustrated in FIG. 2 is a serial printer. The serial printer refers to a printer in which a head is mounted on a carriage moving in a predetermined direction and which discharges liquid droplets onto a recording medium by the movement of the head in connection with the movement of the carriage.

As illustrated in FIG. 2, the printer 1 has a carriage 3 on which a head 2 is mounted, a carriage movement mechanism 4 moving the carriage 3 in a medium width direction of a recording medium P, and a medium feeding mechanism 5 transporting the recording medium P in the medium feeding direction. The printer 1 has a control unit 6 controlling an operation of the entire printer 1. The medium width direction is a main scanning direction (head scanning direction). The medium feeding direction is a subscanning direction (a direction orthogonal to the main scanning direction).

As illustrated in FIG. 2, the head 2 is connected to an ink storing section 8 individually storing a recording ink or a substitution ink through an ink supply tube 9 (ink flow passage). It is configured so that the recording ink and the substitution ink each can be supplied to the head 2 by a switching section.

As the printer 1 according to this embodiment, a so-called off-carriage type printer in which the ink storing section 8 is attached to a casing or the like of the printer 1 and an ink is supplied to the head 2 through the ink supply tube 9 is described as an example but the printer 1 is not limited thereto. For example, a so-called on-carriage type printer in which an ink cartridge is mounted on a carriage may be used. Moreover, a line head type printer not having a carriage may be used.

A home position serving as the scanning starting point of the head 2 is set on the outside of a region where the recording medium P is transported within the movement range of the head 2. At the home position, the maintenance unit 50 containing a cap member is provided.

The maintenance unit 50 is configured so as to perform a moisturizing operation, a flashing operation, a head cleaning operation, and the like. Specifically, the moisturizing operation is an operation of suppressing the drying of a nozzle opening (not illustrated) of the head 2 by capping the head 2 with the cap member in operations other than a recording operation. The flashing operation is an operation of preventing clogging of the nozzle opening or the like by preliminarily discharging a recording ink to the cap member from the nozzle opening of the head 2. The head cleaning operation is an operation of, after capping the head 2 with the cap member, mutually replacing the recording ink or the substitution ink of the ink flow passage while driving a suction pump (not illustrated) to discharge each ink from each nozzle.

EXAMPLES

Hereinafter, the invention is more specifically described with reference to Examples and Comparative Examples. The invention is not particularly limited at all by the following Examples.

Materials for Ink Composition

Main materials for ink compositions used in the following Examples, Comparative Examples, and Reference Example are as follows.

Coloring Material
    Pigment Yellow 74 (Table 1A)
    Pigment Yellow 74 (Table 1B)
    Pigment Yellow 74 (Table 1C)
    Pigment Yellow 74 (Table 1D)
    Pigment Yellow 155 (Trade Name: Ink Jet Yellow 4G, manufactured by Clariant)

Organic Solvent A
    3-methyl-1,5-pentanediol (Normal boiling point: 250° C.) (manufactured by Tokyo Kasei Kogyo Co., Ltd.)
    Ethylene glycol-2-ethyl hexyl ether (Normal boiling point: 229° C.) (manufactured by NIPPON NYUKAZAI CO., LTD.)
    Diethylene glycol-2-ethyl hexyl ether (Normal boiling point: 272° C.) (manufactured by Tokyo Kasei Kogyo Co., Ltd.)
    2-ethyl-1,3-hexanediol (Normal boiling point: 244° C.) (manufactured by NIPPON NYUKAZAI CO., LTD.)

Other Organic Solvents
    Glycerol (Normal boiling point: 290° C.) (manufactured by Tokyo Kasei Kogyo Co., Ltd.)

Triethylene glycol (Normal boiling point: 287° C.) (manufactured by Tokyo Kasei Kogyo Co., Ltd.)

Triethylene glycol monobutyl ether (Normal boiling point: 271° C.) (manufactured by Tokyo Kasei Kogyo Co., Ltd.)

1,2-hexanediol (Normal boiling point: 223° C.) (manufactured by Tokyo Kasei Kogyo Co., Ltd.)

1,2-butanediol (Normal boiling point: 193° C.) (manufactured by Tokyo Kasei Kogyo Co., Ltd.)

1,7-heptanediol (Normal boiling point: 262° C.) (manufactured by Tokyo Kasei Kogyo Co., Ltd.)

pH Adjuster

Triethylamine (Normal boiling point: 90° C.) (manufactured by Tokyo Kasei Kogyo Co., Ltd.)

Triethanolamine (Normal boiling point: 335° C.) (manufactured by Tokyo Kasei Kogyo Co., Ltd.)

Surfactant

Acetylenediol-based surfactant: Olefin E1010 (manufactured by Nissin Chemical Industry Co., Ltd.)

Silicone-based surfactant: BYK348 (manufactured by BYK Chemie Japan)

Preparation of Pigment Yellow 74 A 120 parts of a dry pigment (PY-74) obtained by diazotizing 2-methoxy-4-nitroaniline in accordance with a usual method, and then coupling and aging the same with 2-methoxyacetoacetoanilide, 600 parts of sodium chloride, and 165 parts of diethylene glycol were charged in a kneader to which a pressurization lid was attached, and then preliminarily kneaded until a uniformly moisturized lump was formed. Subsequently, the pressurization lid was lowered, and then kneading and grinding were started while pressing the contents at a pressure of 6 kg/cm$^2$. The kneading and grinding processing was performed for 4 hours while controlling the cooling temperature and the refrigerant amount so that the content temperature reached 40 to 45° C.

The obtained ground substance was placed in 300 parts of a 2% sulfuric acid aqueous solution warmed to 40° C., stirred for 1 hour, filtered and washed with water to remove the sodium chloride and the diethylene glycol, and then dried with a 80° C. hot air dryer for 24 hours to give yellow pigment powder. With respect to the average particle diameter of the pigment determined from an electron microscopic photograph, the major axis was 117 nm and the minor axis was 90 nm. The half width determined from the 11.8° peak in an X-ray diffraction spectrum was 0.4160 and the average value of the length ratio of the major axis to the minor axis of crystal particles was 1.3.

Preparation of Pigment Yellow 74 B

A dry pigment obtained by diazotizing 2-methoxy-4-nitroaniline in accordance with a usual method, and then coupling and aging the same with a mixture of 2-methoxyacetoacetoanilide and 3% acetoaceto-4-sulfanilic acid potassium salt thereof was in the same manner as in Example 1 to give yellow pigment powder. With respect to the average particle diameter of the pigment, the major axis was 96 nm and the minor axis was 80 nm. The half width of the 11.7° peak was 0.424°. The average value of the length ratios of the major axis to the minor axis of crystal particles was 1.2.

Preparation of Pigment Yellow 74 C

A pigment slurry obtained by diazotizing 2-methoxy-4-nitroaniline in accordance with a usual method, and then coupling the same with 2-methoxyacetoacetoanilide was divided in half. Then, the temperature of one half slurry was increased to 90° C., and then the resultant substance was further aged at 90° C. for 1 hour to give a yellow pigment. The yellow pigment was filtered, washed with water, and then dried at 90° C. with a hot air dryer for 24 hours to give yellow pigment powder. The pigment contained needlelike crystal particles and the average value of the length ratios of the major axis to the minor axis determined from the crystal particles was 3.2. With respect to the average particle diameter, the major axis was 280 nm and the minor axis was 90 nm and the half width at 11.7° was 0.375°.

Preparation of Pigment Yellow 74 D

The temperature of the remaining half of the slurry of the azo pigment obtained in Comparative Example 1 was increased to 70° C., and then the resultant substance was further aged at 70° C. for 1 hour to give a yellow pigment. The yellow pigment was filtered, washed with water, and then dried at 70° C. with a hot air dryer for 24 hours to give yellow pigment powder. The pigment contained rod-shaped crystal particles and the average value of the length ratios of the major axis to the minor axis determined from the crystal particles was 1.3. With respect to the average particle diameter, the major axis was 65 nm and the minor axis was 50 nm and the half width at 11.5° was 0.863°. Average value of major axis/minor axis length ratios The pigment particles were photographed using a scanning electron microscope (Trade-name "JSM-7800 FPRIME", manufactured by JEOL Co., Ltd.). Then, the minor axis and the major axis of a primary particle of the pigment were measured, and then the ratio (Major axis/Minor axis) of the major axis to the minor axis was calculated. The average of values of "Major axis/Minor axis" calculated for about 100 arbitrarily selected pigment primary particles was set as the average value of the major axis/minor axis length ratios of each pigment.

Maximum Peak or Peak Comparable Thereto in X-Ray Diffraction Spectrum

The half width was determined from the 11.8° peak in an X-ray diffraction spectrum to Cu-Kα rays of each pigment powder.

TABLE 1

|   | Half width (around 11.8°) | Major axis/Minor axis (Average value nm) | Length ratio (Major axis/Minor axis) |
|---|---|---|---|
| A | 0.416° | 117/90 | 1.3 |
| B | 0.424° | 96/80 | 1.2 |
| C | 0.375° | 280/90 | 3.2 |
| D | 0.863° | 65/50 | 1.3 |

Preparation of Ink Composition

The pigment obtained by the preparation above, styrene, and a resin dispersant (not shown in Table 2) which is a copolymer of acrylic acid and an acrylate-based monomer were mixed with water in a mass ratio of 3:1, and then stirred by a ball mill for 1 hour to give a pigment dispersion liquid. Next, the pigment dispersion liquid and the remaining materials were mixed in the compositions shown in the following Table 2, and then sufficiently stirred to give each ink composition. In the following Table 1, the unit of the numerical value is % by mass and the total is 100.0% by mass.

Surface Tension

The surface tension of each ink composition was measured at a liquid temperature of 25° C. by the Wilhelmy method using a surface tension meter (for example, Surface tension meter CBVP-Z manufactured by Kyowa Interface Science Co., LTD., and the like).

TABLE 2

| | Normal boiling point of organic solvent | Examples 1 | 2 | 3 | 4 | 5 | 6 | 7 | Comparative Examples 1 | 2 | 3 | 4 | 5 | 6 | 7 | 8 | Reference Example 1 |
|---|---|---|---|---|---|---|---|---|---|---|---|---|---|---|---|---|---|
| Pigment Yellow 74 (Table 1 A) | | 5 | 5 | 5 | | | | | | | 5 | | | | | | |
| Pigment Yellow 74 (Table 1 B) | | | | | 5 | 5 | 5 | 5 | 5 | 5 | | | | | | | |
| Pigment Yellow 74 (Table 1 C) | | | | | | | | | | | | 5 | | | | | |
| Pigment Yellow 74 (Table 1 D) | | | | | | | | | | | | | 5 | | 5 | | |
| Pigment Yellow 155 | | | | | | | | | | | | | | 5 | | 5 | 5 |
| Organic solvent A: 3-methyl-1,5-pentanediol | 250° C. | 10 | | 10 | 10 | | | | | | | | 10 | | | | 10 |
| Ethylene glycol-2-ethyl hexyl ether | 229° C. | | | | | 5 | | | | | | | | | | | |
| Diethylene glycol-2-ethyl hexyl ether | 272° C. | 0.6 | 0.6 | | 0.6 | 0.6 | 5 | 0.6 | | | | 0.6 | 0.6 | | | | 0.6 |
| 2-ethyl-1,3-hexanediol | 244° C. | | | | | | | 5 | | | | | | | | | |
| Other organic solvents: Glycerol | 290° C. | 10 | 10 | 10 | 10 | 10 | 10 | 10 | 10 | 10 | 10 | 10 | 10 | 10 | 10 | 10 | 10 |
| Triethylene glycol | 287° C. | 5 | 5 | 5 | 5 | 5 | 5 | 5 | 5 | 5 | 5 | 5 | 5 | 5 | 5 | 5 | 5 |
| Triethylene glycol monobutyl ether | 271° C. | | | | | | | | | 10 | | | | | | | |
| 1,2-hexanediol | 223° C. | | | | | | | | 10 | | | | | | | | |
| 1,2-butanediol | 193° C. | | | | | | | | | | 10 | | | | | | |
| 1,7-heptanediol | 262° C. | | | | | | | | | | | | | | 10 | | |
| pH adjuster: Triethylamine | | 0.4 | | | | | | | | | | | | | | | |
| Triethanolamine | | 0.6 | | 0.4 | 0.4 | 0.4 | 0.4 | 0.4 | 0.4 | 0.4 | 0.4 | 0.4 | 0.4 | 0.4 | 0.4 | 0.4 | 0.4 |
| Surfactant: Acetylenediol-based surfactant E1010 | | | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Silicone-based surfactant BYK348 | | | | | | | | | | | | | | | | | |
| Water | | Balance | Balance | Balance | Balance | Balance | Balance | Balance | Balance | Balance | Balance | Balance | Balance | Balance | Balance | Balance | Balance |
| Evaluation: Total | | 100 | 100 | 100 | 100 | 100 | 100 | 100 | 100 | 100 | 100 | 100 | 100 | 100 | 100 | 100 | 100 |
| Surface Tension (mN/m) | | 33.0 | 25.0 | 26.0 | 32.0 | 28.0 | 27.0 | 28.0 | 28.0 | 28.0 | 27.0 | 28.0 | 28.0 | 33.0 | 35.0 | 34.0 | 28.0 |
| Lightfastness rank | | 1 | 1 | 1 | 2 | 1 | 1 | 1 | 1 | 1 | 1 | 1 | 3 | 1 | 1 | 3 | 1 |
| Color saturation rank | | 1 | 1 | 1 | 1 | 1 | 1 | 1 | 1 | 1 | 1 | 2 | 1 | 1 | 1 | 1 | 3 |
| Discharge stability rank | | 2 | 1 | 2 | 1 | 2 | 2 | 2 | 1 | 1 | 1 | 3 | 1 | 1 | 3 | 1 | 1 |
| VOC dissipation amount rank | | 1 | 1 | 1 | 1 | 2 | 2 | 2 | 3 | 3 | 3 | 1 | 1 | 1 | 1 | 1 | 1 |

TABLE 2-continued

| | Examples | | | | | | | Comparative Examples | | | | | | | | Reference Example |
|---|---|---|---|---|---|---|---|---|---|---|---|---|---|---|---|---|
| Normal boiling point of organic solvent | 1 | 2 | 3 | 4 | 5 | 6 | 7 | 1 | 2 | 3 | 4 | 5 | 6 | 7 | 8 | 1 |

Recording Test

Recording was performed by charging each ink composition into a head using an ink jet printer ("SC-T7250" Model, manufactured by Seiko Epson Corp.). As a target recording medium, an ink jet photopaper (gloss) (manufactured by Seiko Epson Corp.) was used.

For the creation of recorded matter to be used in indoor lightfastness evaluation described below, recording was performed using a black ink, a cyan ink, and a magenta ink shown in the following Table 3 besides the ink of each example of Table 2. The black ink, the cyan ink, and the magenta ink were prepared in the same manner as in the ink compositions of Examples, except using substances shown in Table 3 as pigments and other components.

TABLE 3

|  |  | Black | Cyan | Magenta |
|---|---|---|---|---|
| Dispersion liquid | Pigment Black 7 | 6.00 | | |
|  | Pigment Blue 15:3 | | 4.00 | |
|  | Pigment Red 202 | | | 5.00 |
| Moisturizer | Glycerol | 10.00 | 10.00 | 10.00 |
|  | TEG | | | 4.50 |
| pH adjuster | Triethanolamine | | 0.90 | 0.90 |
|  | Tripropanolamine | 2.40 | | |
| Penetrant | EHDG | 0.30 | 0.30 | 0.30 |
|  | MPD | 10.00 | 10.00 | 10.00 |
| Surfactant | PD002W | 0.10 | 0.30 | 0.10 |
|  | BYK348 | 0.20 | 0.30 | 0.70 |
| Resin | DYNAFLOW K201 (manufactured by JSR) | 6.67 | 4.00 | |
|  |  | Balance | Balance | Balance |

Indoor Lightfastness

The indoor lightfastness was evaluated based on JEITA CP3901B. The evaluation was performed using a photopaper gloss (manufactured by Seiko Epson Corp.) as a printing medium and a spectrum photometer ("Gretag-Macbeth AG SPM50", manufactured by Gretag) for colorimetry. The lightfastness of each ink composition was evaluated based on the following evaluation criteria.

Evaluation Criteria
1: The indoor lightfastness is 60 years or more.
2: The indoor lightfastness is 40 years or more and less than 60 years.
3: The indoor lightfastness is of less than 40 years.

Color Saturation

Recorded matter was obtained by recording a mixed-color gradation pattern at a maximum resolution of 1440×720 dpi on a photopaper gloss (manufactured by Seiko Epson Corp.). The pattern was a gradation pattern obtained by using the ink compositions shown in Table 2 and the cyan ink shown in Table 3, fixing the adhesion amount ratio (mass ratio) of two ink compositions on a recording medium at 1:1, and setting and the maximum ink adhesion amount to 100%, and then gradually reducing the adhesion amount to the 5% (mass) adhesion amount thereof at a 5% interval. The maximum ink adhesion amount was set to 10 mg/inch².

Subsequently, C* was measured. Specifically, pattern WP colorimetry was performed using a spectrum photometer ("Gretag-Macbeth AG SPM50", manufactured by Gretag) to determine the coordinates of the L*a*b* color system of the color difference displaying method specified in CIE. As the conditions herein, a light source D50 was used, no light source filter was used, the viewing angle was set to 20, and the white standard was set to absolute white. From the obtained value, the color saturation C* of the pattern was determined by the following expression.

$$C^* = ((a^*)^2 + (b^*)^2)^{1/2}$$

The maximum value among the obtained C* was determined, and then the color reproducibility of each ink composition was evaluated based on the following evaluation criteria.

Evaluation Criteria
1: The maximum value of C* is 81 or more.
2: The maximum value of C* is 79 or more and less than 81.
3: The maximum value of C* is less than 79.

Discharge Stability

Continuous printing for 30 minutes was performed using the recording apparatus used in the recording test, the number of nozzles in which a landing position deviation or non-discharge occurred among 360 nozzles was counted, and then the discharge stability of each ink composition was evaluated based on the following evaluation criteria.

Evaluation Criteria
1: The number of nozzles in which a landing position deviation or non-discharge occurred is within 1.
2: The number of nozzles in which a landing position deviation or non-discharge occurred is 2 or more and 5 or less.
3: The number of nozzles in which a landing position deviation or non-discharge occurred is 6 or more.

VOC Dissipation Amount

Recording was performed using the recording apparatus used in the recording test. During the recording, the VOC dissipation amount was measured according to Public Interest Incorporated Foundation Japan Environment Association, Eco mark product category No. 155 Certification Criteria "Imaging Equipment Such as Copiers, Printers, etc. Version1.2" to evaluate the VOC dissipation amount of each ink composition based on the following evaluation criteria.

Evaluation Criteria
1: The VOC dissipation amount is less than 18 mg/h.
2: The VOC dissipation amount is 18 mg/h or more and less than 25 mg/h.
3: The VOC dissipation amount is 25 mg/h or more.

The ink compositions of Examples demonstrate excellent lightfastness, discharge stability, and VOC dissipation amount reduction. Furthermore, the color saturation was also excellent. On the other hand, the ink compositions of Comparative Examples were poor in any of lightfastness, discharge stability, and VOC dissipation amount reduction.

In detail, a comparison between Example 2 and Example 3 showed that, when diethylene glycol-2-ethyl hexyl ether was contained as the organic solvent A, the discharge stability was particularly excellent. It was found that the 3-methyl-1,5-pentanediol has high solubility in water, can be contained in a large proportion in an ink, and can sufficiently easily reduce the surface tension of an ink as compared with diethylene glycol-2-ethyl hexyl ether.

A contrast between Examples and Comparative Examples 5 and 8 showed that the lightfastness was poor in the case of not using a pigment in which the half width of the maximum peak or a peak comparable thereto in an X-ray diffraction spectrum is 0.7° or less. Moreover, Comparative Example 4 showed that the discharge stability was poor in the case of not using a pigment in which the average value of the major axis/minor axis length ratios is 1.7 or less.

Moreover, it is found that Comparative Example 1 not using the organic solvent A and using 1,2-hexanediol having a relatively low boiling point and Comparative Example 3 not using the organic solvent A and using 1,2-heptanediol have excellent discharge stability but are problematic from the viewpoint of the VOC dissipation amount.

Furthermore, it is found that Comparative Example 2 using triethylene glycol monobutyl ether having a relatively high boiling point in place of 1,2-hexanediol and Comparative Example 6 using 1,7-heptanediol have excellent VOC dissipation amount but are problematic from the viewpoint of discharge stability.

Furthermore, it is found that Comparative Example 7 not using any solvent other than glycerol and triethylene glycol is problematic from the viewpoint of discharge stability.

Moreover, it is found that Comparative Example 8 using 1,2-heptanediol has no problem in discharge stability when a pigment whose crystallinity is not high was used.

The entire disclosure of Japanese Patent Application No. 2017-052682, filed Mar. 17, 2017 is expressly incorporated by reference herein.

What is claimed is:

1. An aqueous ink jet ink composition comprising:
    a pigment in which a half width of a maximum peak or a peak comparable thereto in an X-ray diffraction spectrum is 0.7° or less and an average value of major axis/minor axis length ratios is 1.7 or less; and
    an organic solvent A, the organic solvent A containing an alkanediol (1) containing an alkyl skeleton having a branched structure and an alkylene glycol alkyl ether (2) containing at least any one of alkylene glycol containing an alkyl skeleton having a branched structure and an ether of an alkyl group having a branched structure, and which has a normal boiling point of 225° C. or more.

2. The aqueous ink jet ink composition according to claim 1, wherein
    the pigment is an azo-based pigment.

3. The aqueous ink jet ink composition according to claim 1, wherein
    the organic solvent A contains an organic solvent having a normal boiling point of 245° C. or more.

4. The aqueous ink jet ink composition according to claim 1, wherein
    a content of an organic solvent having a normal boiling point of less than 225° C. is 1% by mass or less based on a total amount of the ink composition.

5. The aqueous ink jet ink composition according to claim 1, wherein
    a content of the organic solvent A is 0.5 to 20% by mass based on a total amount of the ink composition.

6. The aqueous ink jet ink composition according to claim 1, wherein
    a content of the pigment is 0.5 to 15% by mass based on a total amount of the ink composition.

7. The aqueous ink jet ink composition according to claim 1, wherein
    the organic solvent A contains an organic solvent having 5 to 15 carbon atoms.

8. The aqueous ink jet ink composition according to claim 1, further comprising
    an organic solvent which has a normal boiling point of more than 280° C. and which is other than the organic solvent A.

9. The aqueous ink jet ink composition according to claim 1, wherein
    a surface tension is 34 mN/m or less.

10. The aqueous ink jet ink composition according to claim 1, further comprising
    a surfactant, wherein
    the surfactant contains at least one selected from the group consisting of a silicone-based surfactant, an acetylene glycol-based surfactant, and a fluorine-based surfactant.

11. The aqueous ink jet ink composition according to claim 1, wherein the alkylene glycol alkyl ether is selected from the group consisting of propylene glycol-2-ethyl hexyl ether, dipropylene glycol-2-ethyl hexyl ether, tripropylene glycol-2-ethyl hexyl ether, butylene glycol-2-ethyl hexyl ether, dibutylene glycol-2-ethyl hexyl ether, tributylene glycol-2-ethyl hexyl ether, ethylene glycol-diethyl hexyl ether, diethylene glycol-diethyl hexyl ether, triethylene glycol-diethyl hexyl ether, propylene glycol-diethyl hexyl ether, dipropylene glycol-diethyl hexyl ether, tripropylene glycol-diethyl hexyl ether, butylene glycol-diethyl hexyl ether, dibutyleneglycol-diethyl hexyl ether, and tributylene glycol-diethyl hexyl ether.

* * * * *